United States Patent
Song et al.

(10) Patent No.: US 7,962,771 B2
(45) Date of Patent: Jun. 14, 2011

(54) METHOD, SYSTEM, AND APPARATUS FOR REROUTING INTERRUPTS IN A MULTI-CORE PROCESSOR

(75) Inventors: Justin Song, Olympia, WA (US); Devadatta V. Bodas, Federal Way, WA (US); Ohad Falik, Kfar-Saba (IL); Alon Naveh, Ramat Hasharon (IL); Ilan Pardo, Ramat Hasharon (IL); Anil Aggarwal, Portland, OR (US); Sridhar Muthrasanallur, Puyallup, WA (US); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/967,799

(22) Filed: Dec. 31, 2007

(65) Prior Publication Data

US 2009/0172423 A1 Jul. 2, 2009

(51) Int. Cl.
*G06F 1/00* (2006.01)
(52) U.S. Cl. .................................... 713/300; 713/324
(58) Field of Classification Search .......... 713/300–340; 710/268
See application file for complete search history.

(56) References Cited

U.S. PATENT DOCUMENTS

| | | | |
|---|---|---|---|
| 5,282,272 A * | 1/1994 | Guy et al. | 710/116 |
| 5,428,799 A * | 6/1995 | Woods et al. | 710/266 |
| 6,442,700 B1 * | 8/2002 | Cooper | 713/320 |
| 6,658,532 B1 * | 12/2003 | Horrigan et al. | 711/135 |
| 6,772,241 B1 * | 8/2004 | George et al. | 710/36 |
| 6,792,550 B2 * | 9/2004 | Osecky et al. | 713/300 |
| 6,976,131 B2 | 12/2005 | Pentkovski et al. | |
| 7,043,405 B2 | 5/2006 | Orenstien et al. | |
| 7,191,349 B2 * | 3/2007 | Kaushik et al. | 713/323 |
| 7,222,251 B2 * | 5/2007 | Ahmad et al. | 713/322 |
| 2004/0128563 A1 * | 7/2004 | Kaushik et al. | 713/300 |
| 2006/0053326 A1 | 3/2006 | Naveh et al. | |
| 2006/0212677 A1 | 9/2006 | Fossum | |
| 2007/0157042 A1 | 7/2007 | Jahagirdar et al. | |

* cited by examiner

*Primary Examiner* — Paul R Myers
(74) *Attorney, Agent, or Firm* — Caven & Aghevli LLC

(57) ABSTRACT

A method, system, and apparatus may route an interrupt to a first core of a plurality of cores of a multi-core system. If the first core is in an idle or low power state, or operating in a power state at or below a threshold power state, a core in a least idle state may be found. The interrupt may be rerouted to and processed by the core in the least idle state. Cores in a multi-core system may be rated based on for example, power states or other characteristics, and interrupts may be assigned based on these ratings. Other embodiments are described and claimed.

28 Claims, 5 Drawing Sheets

| APIC and Power StateTable | | |
|---|---|---|
| | LP0... | LPn |
| Core 0 | LA, Cx | LA, Cx |
| ...... | | |
| Core n | LA, Cx | LA, Cx |

METHOD, SYSTEM, AND APPARATUS FOR REROUTING INTERRUPTS IN A MULTI-CORE PROCESSOR

BACKGROUND OF THE INVENTION

To reduce power consumption, some modern computing systems place the processor or processors in a lower power consuming or idle state. With the advent of multi-core processors, management of the power states of two or more cores becomes a more complex problem than for single core processors. The exit latency of a core's transition from an idle or low power state to a more active power state may hinder processor performance and power consumption. Exit latency related performance limitations may become apparent when a processor receives and services an interrupt. Further complexities may be introduced in managing the power states of a multi-core processor for which each core includes two or more logical processors for independently executing separate threads.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 5 is a flowchart of a method for rerouting interrupts in a multi-core processor according to an embodiment of the invention It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action an/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

As used herein a logical processor may be or include a logical unit or block capable executing a stream of instructions or thread, for example as used in the IA-32 architecture by Intel Corporation. In some embodiments each logical processor may include at least a full set of data registers, segment registers, control registers, debug registers, and machine specific registers. Each logical processor may also have its own advanced programmable interrupt controller (APIC). In some embodiments, each core of a multi-core processor may have only one logical processor. Alternatively, two or more logical processors may be provided on a single core of a multi-core processor to for example allow two or more threads or processors to be executed simultaneously or independently of each other. These logical processors may share some core resources of the processor such as for example an execution engine and a system bus interface. After power up and initialization, each logical processor may be independently directed to execute a specified thread, interrupted, or halted.

Embodiments of the invention may provide a method and system for rerouting interrupts in a multi-core processor. In one embodiment, a multi-core processor may, upon receiving an interrupt addressed to a particular logical processor of a first core, assign the interrupt for servicing to the logical processor for processing. The processor may check the power state of the first core and may compare the power state to a threshold power state. If the first core is in an idle state, e.g. operating at or below the threshold power level, or in a power state at or below a threshold power state, the processor may search the other cores to determine the or a least idle core, e.g. the core or cores in the highest power state among the various power states of the plurality of cores, or the most active core. If a different core is the least idle core, the processor may reroute the interrupt to the least idle core, and demote the first core to a more active power state.

In another embodiment, when an interrupt is received at a multi-core processor operating with two or more logical processors in each core, the power states of all cores may be calculated and any matches between the interrupt and the logical addresses of each logical processor may be identified. Based on these calculations, a score, rating or other evaluation may be assigned to each core, and the interrupt may be assigned to the core with the best score.

Figure 1:
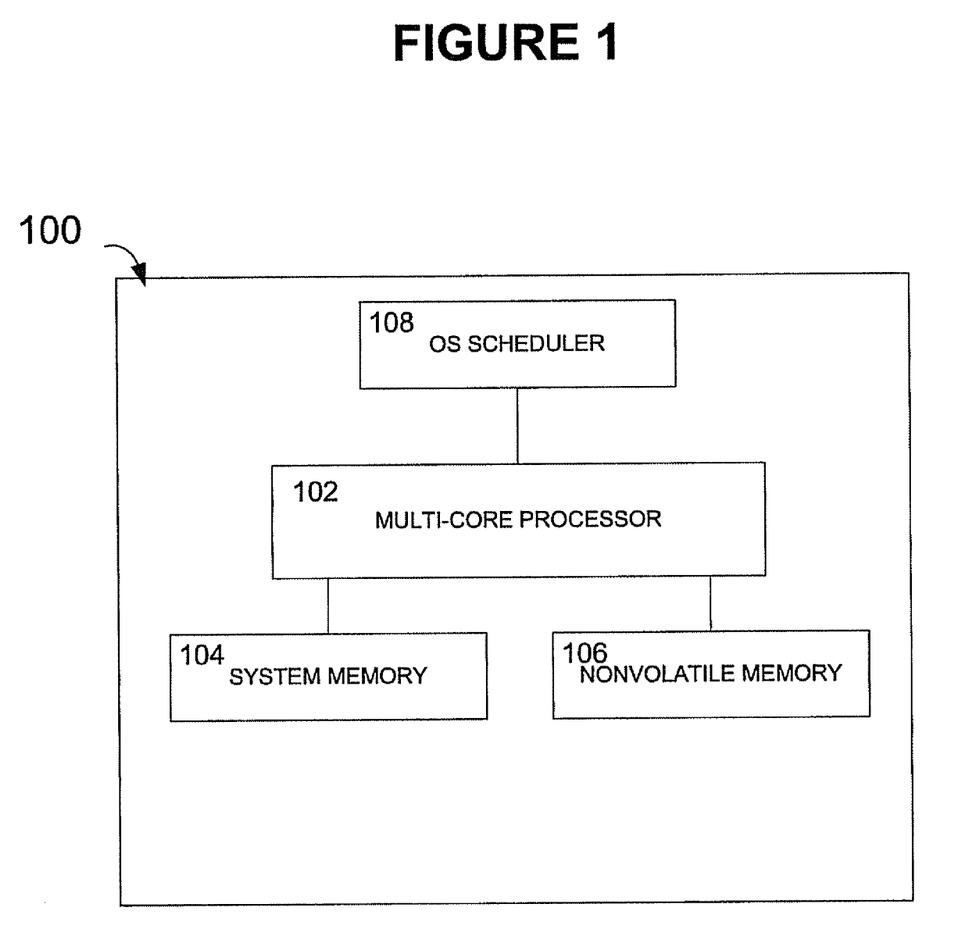
FIG. 1 is a schematic illustration of a computing system according to an embodiment of the invention.

Reference is now made to FIG. 1, a schematic illustration of a computing system 100 capable of rerouting interrupts in a multi-core processor according to embodiments of the invention. Computing system 100 may be or include, for example, a personal computer, a desktop computer, a mobile computer, a laptop computer, a notebook computer, a terminal, a workstation, a server computer, a network device, or other suitable computing device. Although the invention is not limited in this respect, computing system 100 may include at least one multi-core processor 102 operating in accordance with embodiments of the invention. Alternatively, computing system 100 may include multiple processors that may or may not have multiple cores. In addition, computing system 100 may include a system memory 104 and a nonvolatile memory 106 which may be coupled to multi-core processor 102 and an operating system (OS) scheduler 108. Other components or logical elements may also be included in computing system 100 such as for example a peripheral bus or an input/output device.

As used herein, a multi-core processor such as multi-core processor 102 may be or include a single integrated circuit that includes more than one execution core. Each execution core may include logic for executing instructions and dedicated resources as needed for each core to execute instructions individually. In addition, a multi-core processor may have shared resources, e.g. shared by all execution cores, as needed for effective operation of the multi-core processor.

System memory 104 may be or include, for example, any type of memory, such as static or dynamic random access memory or magnetic or optical disk memory. System memory 104 may be used to store instructions to be executed by and data to be operated on by multi-core processor 102, or any such information in any form, such as for example operating system software, application software, or user data.

Nonvolatile memory 106 may be or include, for example, any type of nonvolatile or persistent memory, such as semiconductor-based programmable read only memory or flash memory. Nonvolatile memory 106 may be used to store any instructions or information that is to be retained while computing system 100 is not powered on.

OS scheduler 108 may be responsible for scheduling tasks to multi-core processor 102 and may be a hardware or software component of computer system 100. For example, OS scheduler 108 may be a component of computer system 100's operating system software, although the invention is not limited in this respect. Additionally, OS scheduler 108 may allocate tasks to particular execution cores of multi-core processor 102. In some embodiments OS scheduler 108 may work in conjunction with one or more on die components of multi-core processor 102.

Figure 2:
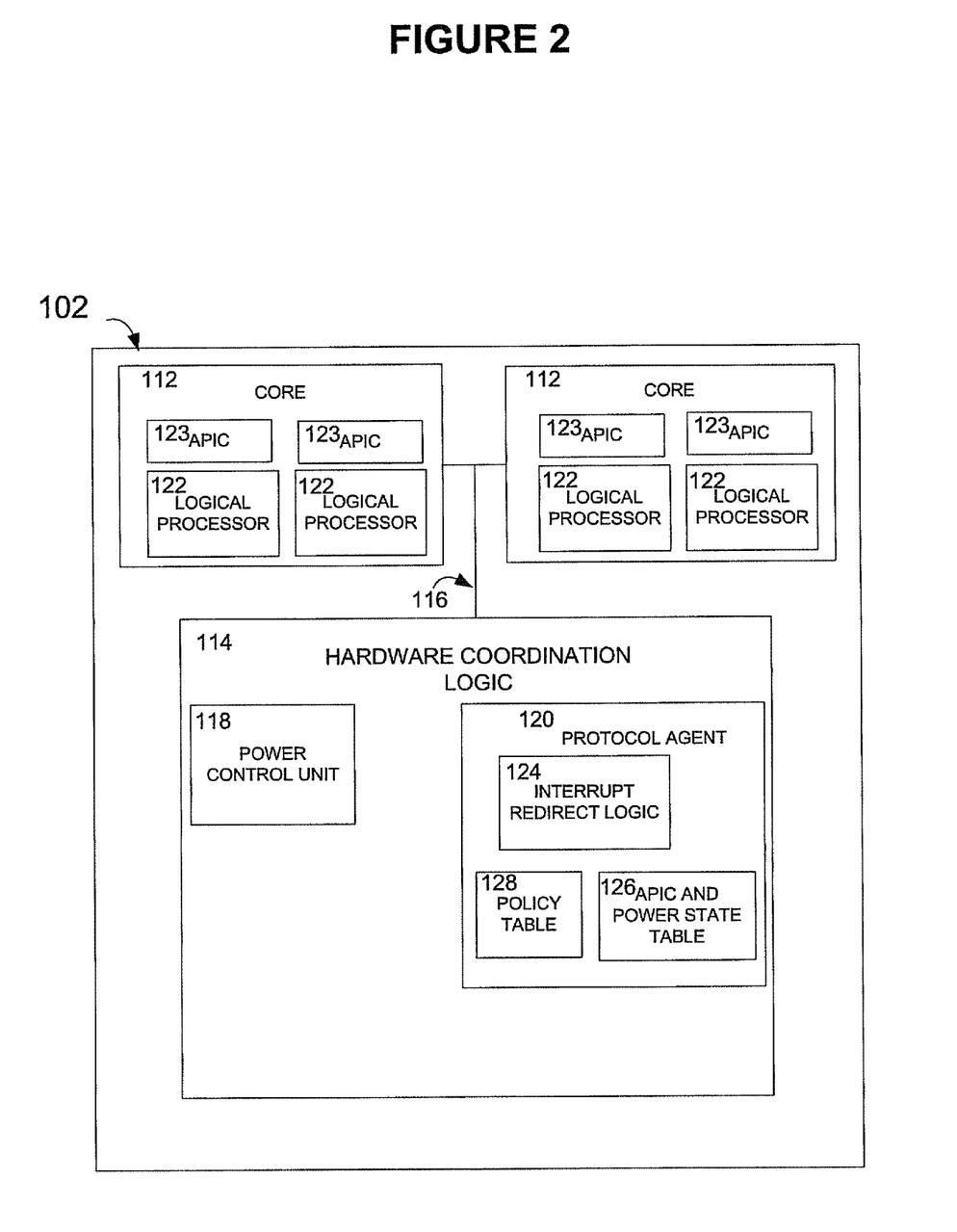
FIG. 2 is a schematic illustration of a multi-core processor according to an embodiment of the invention.

Reference is now made to FIG. 2, a schematic illustration of a multi-core processor 102 according to an embodiment of the invention. Multi-core processor 102 may include two or more cores 112 where each core is fully functional as discussed herein, a hardware coordination logic 114, and a bus 116 for carrying data and instructions among the components of multi-core processor 102. Although FIG. 2 shows two cores 112, the invention is not limited in this respect; any number of cores greater than one may be used without departing from the scope of the invention. The functionality and components of hardware coordination logic 114 may be embodied in other circuits in processor 102.

Each core 112 may have dedicated resources such as for example a private cache and/or registers to identify their respective cores as needed for operation. Although these resources may be physically located in multi-core processor 102, the invention is not limited in this respect. For example, each core 112 may have exclusive access to a portion of system memory 104 or nonvolatile memory 106.

In some embodiments, each core 112 may be capable of multi-threading operations, e.g. executing two or more parallel sets of operations or threads in two or more logical processors 122. Although FIG. 2 shows only two logical processors 122, the invention is not limited in this respect, any number of logical processors 122 may be used.

Each logical processor 122 may have uniquely associated with it an interrupt controller such as an APIC 123 for handling interrupts that may be assigned to a logical processor 122. An APIC need not be used. APIC 123 functionality may be implemented using techniques as known in the art such as for example an XAPIC architecture by Intel Corporation, although other APIC or other interrupt technologies may be used. Each APIC 123 or alternatively each logical processor 122 may have an identification, logical address, or APIC logical identification (ID) which in some embodiments is constructed of a cluster ID and an agent ID. The cluster ID may be or include an identifier that is common to a group of logical processors.

In some embodiments, each logical processor may be assigned uniquely to a cluster according to a policy set by for example the operating system of computing system 100. Such a policy may set a specific size for each cluster such as for example 4, 8, or 16 logical processors (other sizes may be used). To enable redirectable interrupts, it may be desirable to assure that each cluster includes logical processors from at least two cores. One such mechanism for accomplishing this may be to size clusters such that the number of logical processors in each cluster exceeds the number of logical processors in each core. For example in a computing system with two logical processors per core, a cluster size may be set at 4. Logical processors may be assigned to a cluster for example sequentially beginning with a first core, such that once all logical processors of the first core are assigned, the logical processors of a second core are assigned. Alternatively, logical processors may be assigned to a cluster to perform a given task or support an application. Alternatively, for a computing system that may include multiple processors, a cluster may include only those logical processors of a single processor package. Other schemes may also be used.

The agent ID for an APIC 123 may be used to identify that APIC 123, for example within a cluster or other group. In some embodiments, although a number of APICs may have the same agent ID, their complete logical addresses may be unique because each APIC may be assigned to only one cluster. Other addressing schemes for identifying APICs and their associated logical processors may also be used.

In some embodiments, a redirectable or lowest priority interrupt may target a cluster or group of logical processors from two or more cores and may include a mask or set of addressing bits such as for example a bit mask that may indicate which agent IDs, e.g. logical processors within a cluster can handle the interrupt where one logic value, e.g. "1" or "0", may indicate whether or not the corresponding logical processor is a valid target for the interrupt. The agent IDs capable of handling the interrupt may be identified within the mask by for example setting appropriate bits within the mask. Other techniques for identifying agent ID's may also be used. Although the invention is not limited in this respect, a redirectable interrupt may be required to identify at least one agent ID as an allowed target for the redirectable interrupt.

Each core 112 may be able to operate in two or more power states. Operating in multiple power states may allow a computing system to reduce energy consumption and possibly thereby reduce or eliminate performance impacts of hitting the thermal envelope, hitting the voltage envelope, minimize degradation of battery life, other such performance degrading limitations. Reducing energy consumption may have other benefits as well. Other or different benefits may be achieved by embodiments of the invention.

Although other descriptions or standards for defining power states may be used in various embodiments of the invention, the power states discussed herein with respect to one embodiment are referred to as C-states. These C-states may be as described in versions of the Advanced Configuration Power Interface (ACPI) specification such as for example, ACPI Specification Rev. 3.0, Sep. 2, 2004 and adapted to for example Intel Core Duo or other Intel multi-core processor architectures. As used herein, a core C0 (CC0)

state may describe a core in a fully active power state; CC1 may be a low-latency idle state in which the core must maintain cache coherence; and cores in the CC2-CC6 states may increasingly adjust various parameters as known that affect power consumption such as for example voltage, clock speed, and/or the state of different caches associated with each core. Deeper or lower power states, e.g. power states for which a core consumes less power or is in a deeper idle state such as CC2, CC3, CC4, CC5 or CC6, may have a higher penalty in term of exit time, e.g. exit latency, before the core can be transitioned to a more active power state such as CC0 or CC1. Additionally, the energy spent entering and exiting a core may increase as the idleness increases, and thus the cost of waking a core for handling an interrupt may also increase accordingly. Other energy and performance side effects of waking up a core on the core and neighboring cores are also possible.

A deeper or lower power state may take longer to exit than a shallower or higher one. The longer transition may affect overall processor performance and ability to service interrupts in a timely manner. As a result, multi-core processors may limit or preclude core operation in deep power states. Limiting exit latency by avoiding deeper power states may affect time-sensitive applications such as for example in routing voice traffic or streaming video or audio in real-time. When used herein, higher or lower are relative terms, describing the relative power consumption or ordering of power use states.

Because of the differing impacts of core transitions on different measures of processor state and performance, prioritization for redirection may be affected by the assignment policy being implemented. For example, assignment may be based on a policy of conserving power consumption, lowest interrupt latency, fastest performance, and the like. Other policies may also be used.

In some embodiments, each logical processor 122 of a core 112 may also operate in different power states or activity levels as requested by the respective logical processor 122 referred to according to one embodiment as logical processor C-states. Under one nomenclature, a higher index such as LPC2, LPC3, etc. indicates a deeper idle state; other nomenclatures and other power states may be used. For these embodiments, the core's power state may then be determined as the lowest, e.g. least idle LP C-state of all of its logical processors. For example, a core with two logical processors, one in an LPC0 state and one in an LPC2 state, may be in a LPC0 state.

In embodiments in which each core includes two or more logical processors, there may be further impacts on performance for consideration in assigning a redirectable interrupt. Because the logical processors of a given core may share some core resources, changes in the state of one logical processor may affect another. Thus it may be appropriate to evaluate the appropriateness of a logical processor for assignment based on several factors such as for example logical processor activity factor, power wake up penalty, and interrupt matching. Other factors may also be used.

An example having two or more cores with two logical processors each may be illustrative for showing some possible performance tradeoffs. A configuration of one such core wherein one logical processor is active and one is idle may yield the best performance with minimal power impact depending on the assignment policy. In a situation with one core active and one core idle and a policy that is agnostic with respect to power and interrupt latency, the interrupt may be assigned to the idle core. On the other hand in the same situation with a policy of minimizing interrupt latency, the interrupt should always be assigned to the awake core. Further, to prepare for a subsequent interrupt, the idle core may be demoted.

In some embodiments, a combined power state level (CPSL), or other composite rating or evaluation of a core may be determined, possibly in addition to other power state levels. This score or rating may be used in evaluating a core's appropriateness for targeting an interrupt. Once calculated, a CPSL may then be assigned a rating or ranking according to a pre-determined interrupt targeting policy. In some embodiments, the CPSL or composite rating for a given core 112 may be calculated using the core's power state, activity or power state for each of the core's logical processors, power wake up penalty, and an indication of interrupt matching for each of the core's logical processors. The CPSL may be determined by combining a rating (e.g., power state, activity state, wake up penalty, availability or load, etc.) of each processor. The interrupt matching may be determined by the cluster and which agent IDs are targeted in an interrupt. Any logical processor (and associated agent ID) which is identified in an interrupt as an allowable target may be considered as a match. The resulting CPSL may then factor in or combine the number of matches, logical processor states, and/or other indicators of a core's power state.

In some embodiments the CPSL may vary according to the number of logical processors, the number of logical processors per core, and the performance criteria being used. Further, the impacts of state changes of a given logical processor on other logical processors in the same processor may also affect the scoring.

For example, in a core with two logical processors, the following is a non-limiting set of possible CPSL scores; other CPSL scores or ratings may be used:

CPSL_0=both logical processors idle, at least one match, at least one ready, no penalty or lowest wakeup penalty state CPSL_1=one logical processor active, one idle, at least one match CPSL_1a=one logical processor active, only the active logical processor matches CPSL_2=both logical processors are active, at least one match CPSL_3–CPSL_n=both logical processors decreasingly active with increasing index of low power mode, at least one processor match CPSL_I=none of the logical processors match In the scoring above, a higher CPSL may indicate a deeper idle state, but may be affected may the number of matching processors. Other methods of determining CPSL may also be used and other numbers of logical processors may be used.

Hardware coordination logic 114 may be or include those components of multi-core processor 102 coordinating and operating cores 112. Hardware coordination logic may include for example a power control unit (PCU) 118 and a protocol agent 120 and may work in conjunction with other components of computing system 100 such as for example OS scheduler 108. Other components such as for example a shared cache may be included. In addition, although the components of hardware coordination logic are shown as part of multi-core processor 102, the invention is not limited in this respect. Some components or logic may reside off die, e.g. elsewhere as hardware or software in computing system 100.

PCU 118 may be or include logic and components needed for regulating the power state of the cores 112. As such, PCU 118 may monitor and manage the C-state or other power level of each core 112 and each logical processor 122 within its respective core 112 and determine and effect the transitions to and from these states. Additionally or alternatively, a logical process may request a specific C-state; however, the processor's actual C-state may be the minimum, e.g. lowest requested C-state of all cores in the processor.

Transitioning between different C-states or other power states may be accomplished by for example varying operating core 112 clock operating frequency or voltage, adjusting cache states, and/or switching core 112 components on and off, although the invention is not limited in this respect. PCU 118 may issue commands (for example over bus 116) to each core 112 or logical processor 122 for these transitions and may receive data from each core 112 or logical processor 122 such as for example temperature, clock speed or other status indicators. PCU 118 may further include logic for determining what power saving features to activate for each core 112 or logical processor 122 and the timing of these activations. Such logic and other functions of PCU 118 may require inputs from other components of multi-core processor 102 such as for example protocol agent 120 which may generate requests to demote cores to a lower CCx state (such as to CC0), or applications running on computing system 100 as well stored information on thermal limits and the power cost of waking up cores and logical processors.

Although FIG. 2 shows PCU 118 as an on-die component of multi-core processor 102, the invention is not limited in this respect. PCU 118 may be located elsewhere in computing system 100 or be part of another component or components of computing system 100. Locating PCU 118 or some of its functions off-die may be useful for example in multi-core multi-processor computer systems wherein clusters may be defined across a plurality of multi-core processors. In these instances, PCU 118 may require information from logical processors or cores in all processors present in the computing system.

Protocol agent 120 may be or include software or hardware for managing how interrupts are assigned within multi-core processor 102 Protocol agent 120 may work in conjunction with other components of computer system 100 such as for example any input/output components and may assign or route interrupts according to their priority and may determine which core 112 or logical processor 122 should receive an interrupt based on their activity or power state, on processor priorities, interrupt target matching, and possibly other criteria. Communications between protocol agent 120, PCU 118 and each of the cores and logical processors of multi-core processor 102 may use bus 116 or other such medium as known for communications between processor components.

In some embodiments, protocol agent 120 may include an interrupt redirect logic 124, an APIC and power state table 126, and a policy table 128 for performing some of the tasks associated with assigning interrupts. Other components may also be included.

Interrupt redirect logic 124 may be or include a logical block for carrying out operations associated with determining to which core or logical processor within a core an interrupt may be assigned. Interrupt redirect logic 124 may receive interrupts either from sources internal or external to multi-core processor 102, and may select one of the candidate logical processors or agents as the target of the interrupt. For status information on the power state of each logical processor (and associated APIC) and core, interrupt redirect logic may access APIC and power state table 126.

Figure 3:
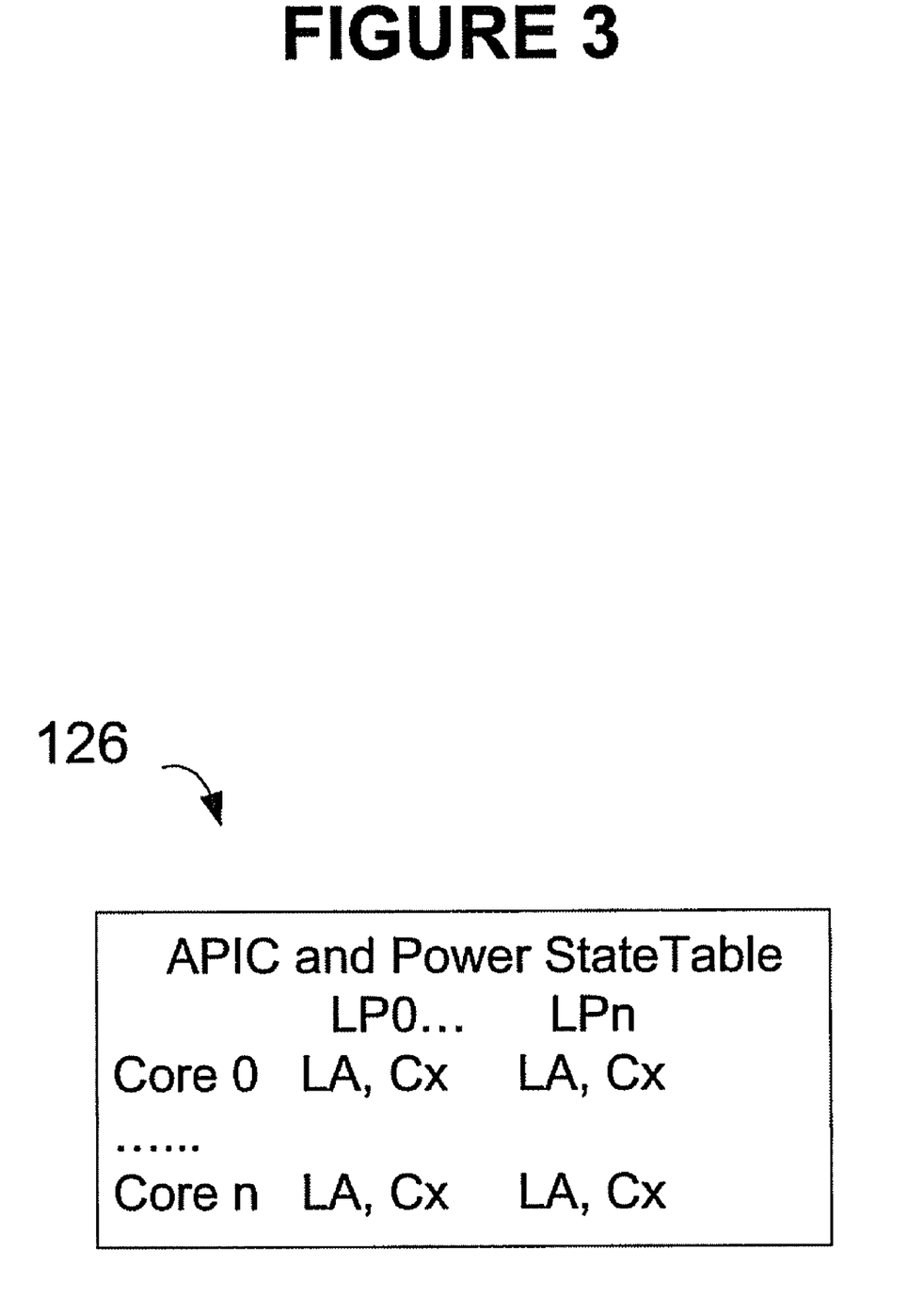
FIG. 3 is a schematic illustration of an advanced programmable interrupt controller (APIC) and power state table according to an embodiment of the invention.

In some embodiments, APIC and power state table 126 may be a two-dimensional chart or table as shown in the embodiment of FIG. 3. APIC and power state table 126 may be arranged such that each column corresponds to logical processors 122 and each row corresponds to a core 112 in the multi-core processor 102. Each entry of APIC and power state table 126 may contain the logical address of a logical processor 122, e.g. its corresponding APIC's logical address (cluster ID and agent ID), APIC enable/disable information, addressing mode used, and its currently requested C-state or power state. Other information that may be required on the APIC state and its ability to handle interrupts may also be included. In this way, a logical processor may be identified for assignment of an interrupt by both its associated cluster through its logical address and its association with a core through its location in APIC and power state table 126. These entries may be updated each time the power state of a logical processor 122 changes or a logical address changes. In some embodiments, this update may be accomplished using a special bus cycle or other means for logical processor 122 to update protocol agent 120. Other techniques may also be used to update APIC and power state table 126. Other methods or data structures may be used to store such data.

To determine how to score or value the power state of a core 112 or logical processor 122, interrupt redirect logic 124 may access policy table 128 which may be a lookup table or other such tabular structure. Alternatively, determining the score of a power state may be accomplished with other functional schemes such as for example parametric logic. Policy table 128 may contain a scoring or prioritization of the different possible CPSLs configured according to a policy established during the setup of policy table 128. These policies may be based on for example minimizing processor power consumption or alternatively on maximizing performance when multi-core processor 102 operation is not thermally limited. Other policies may be based on system state or user/application/OS preference. The ranking or scoring of the different CPSLs may vary accordingly. For example, when performance is more important than power a CPSL3 may be assigned a higher score or rating than a CPSL 2, thereby causing interrupt redirect logic to target an idle logical processor by waking up an idle core instead assigning an interrupt to an active core. In some embodiments, the policy being implemented may change, e.g. may be reset from time to time with a corresponding reconfiguration of policy table 128.

Figure 4:
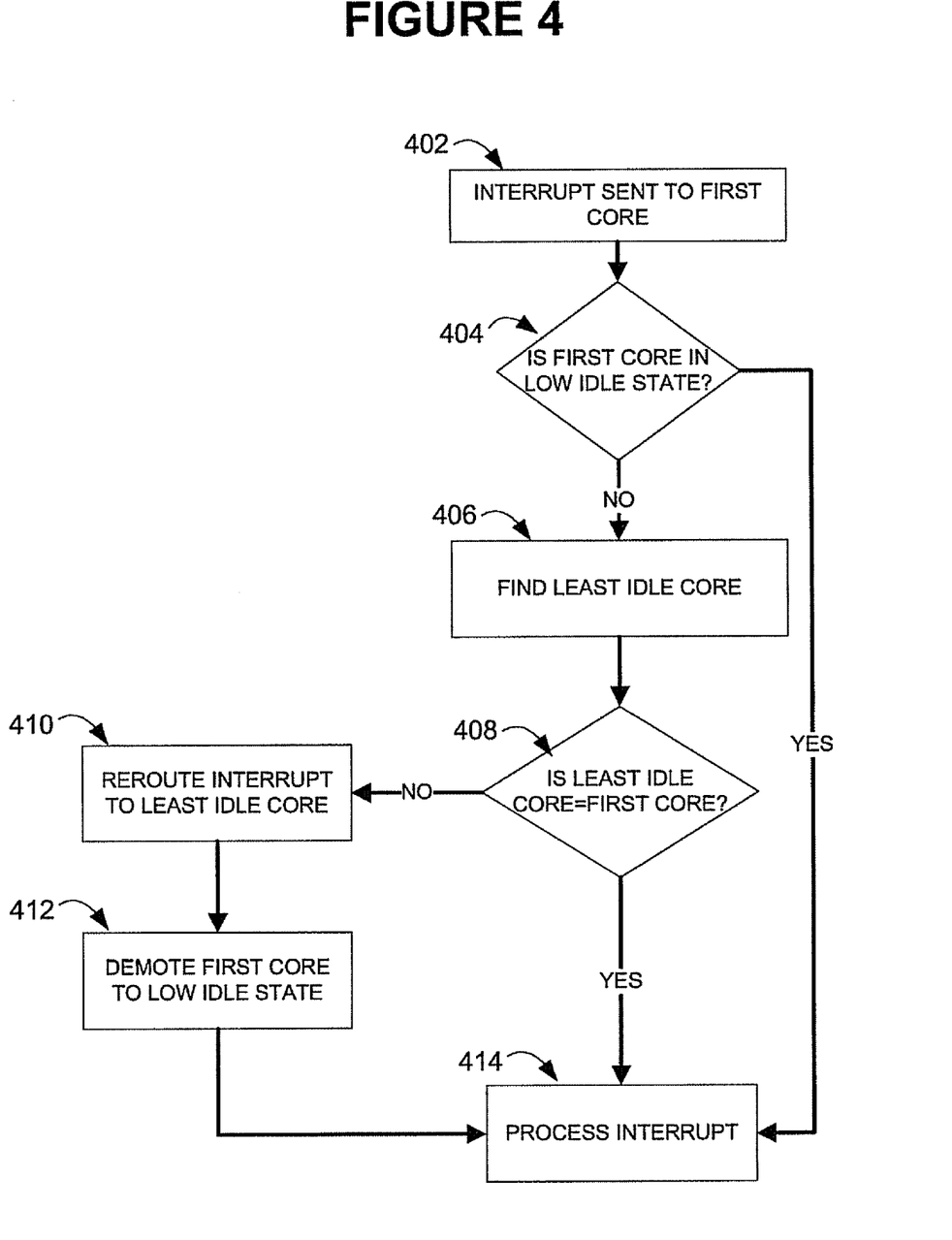
FIG. 4 is a flowchart of a method for rerouting interrupts in a multi-core processor according to an embodiment of the invention.

Reference is now made to FIG. 4, a flowchart of a method for rerouting interrupts in a multi-core processor according to an embodiment of the invention. Embodiments of the method may be used by, or may be implemented by, for example, computing system 100 of FIG. 1 or other suitable computing systems that incorporate multi-core processors. In some embodiments, the method of FIG. 4 may be implemented by protocol agent 120 operating in conjunction with PCU 118, although the invention is not limited in this respect. Additional or alternative components of computing system 100, multi-core processor 102, and/or hardware control logic 114 may be used.

As indicated in operation 402, an interrupt may be sent to a core; an interrupt request may be received by for example protocol agent 120 with an intended target of for example a first core 112. An interrupt request may be triggered for example by the receipt of data such as for example a data packet at an input/output device. Although the embodiment of FIG. 4 shows an interrupt request being sent to a first core 112, the invention is not limited in this respect. In an alternative embodiment, protocol agent 120 and possibly PCU 118 may recognize the intended destination of the interrupt, e.g. the first core 112, and perform the remaining operations of FIG. 4 without sending the interrupt to the first core 112. In some embodiments, a first core may be determined as being among the allowed targets for the interrupt. Additionally or alternatively, a pre-defined scheme such as for example a legacy scheme as known in the art for selecting a core as a target may be used to select a first core.

In operation 404, the power or idle state of the first core 112 may be determined or compared to a threshold power state. In some embodiments, this operation may be performed by for example by PCU 118.

In some embodiments, the threshold power state may be determined for example by exit latency. If the exit latency of a power state may cause a delay beyond an acceptable time interval in responding to an interrupt, then that power state may be considered too deep or too idle. For example, an exit latency of 0.1 μsec for a core C1 (CC1) state may be acceptable, while an exit latency of 7.0 μsec for a CC3 state may be too long for servicing an interrupt.

In some embodiments, if the first core is not operating in a core CC0 or a CC1 state, e.g. is operating in a power state at or below a threshold power state such as for example a threshold between a CC1 and a core CC2 state, then the least idle, e.g. most active core 112, e.g. operating at the highest power level, may be found from among the full set of cores 112 of multi-core processor 102 (operation 406). In some embodiments there may be more than one "least idle" core, since a number of cores may be operating in a state that is the highest power state at which any core is operating. In some embodiments, PCU 118 may have the relevant data present in registers or memory. Alternatively, PCU 118 may query each core to determine its respective power state (e.g., C-state). Other techniques as known may also be used to determine the least idle core. While specific core states are discussed herein, other embodiments operate in other power levels, with other definitions for power levels or idle levels or states.

Once the determination is complete, in operation 408 the identity or address of the least idle core may be compared with that of the first core. If the least idle core is a different core than the first core, then in operation 410 the interrupt may be rerouted by for example protocol agent 120 to the least idle core for servicing. In some embodiments, rerouting an interrupt may be accomplished by rewriting one or more addressing bits in for example a destination field or bitmask associated with the interrupt request to match the address of the least idle core 112.

In operation 412, the first core is demoted to a less idle power stated such as CC0 or CC1. The interrupt may, in operation 414, be serviced by the least idle core. In some embodiments, these operations may be performed simultaneously. One non-limiting advantage of such simultaneous operations may be to lower multi-core processor 102's response time to the next interrupt request. In some embodiments, if the demotion of the first core were to occur after the least idle core's servicing of the interrupt request, the exit latency of the first core's activation from an idle state may still hinder system performance because multi-core processor 102 may be required to wait for processing a subsequent interrupt directed to the first core during the first core's demotion if no other active cores were available.

Returning to operation 404, if the first core is found to be in an active state, e.g. at a power state or level above the threshold power state or level, for example CC0 or CC1 if the threshold is below CC1, the method may proceed immediately with the first core servicing the interrupt request (operation 414) because the exit latency of the first core may have either a limited (in the case of a CC1 state) or no effect (in the case of a CC0) on processor performance. Similarly, in operation 408 if it is determined that the first core is the least idle core as compared to the other cores of processor 102, e.g. there is no other core that is more active or in a higher power state, the method may proceed with the first core servicing or processing the interrupt request (operation 414) as well.

Thus embodiments of the invention may reroute an interrupt assigned to or addressed to a particular core which is in a deeper power state or at or below a threshold power state to one in a more active or higher power state. This may in some embodiments improve the response time for servicing interrupts and possibly allowing one or more cores to operate or remain longer in a deeper (e.g. a more idle) power state. Further, in anticipation of subsequent interrupts, the power state of the core in the deep power state may be raised or demoted to a more active power state after rerouting of the interrupt to a more active core thereby hiding the exit latency of the idle core. Embodiments of the invention may, therefore, enable more use of C6 or other idle power states.

Figure 5:
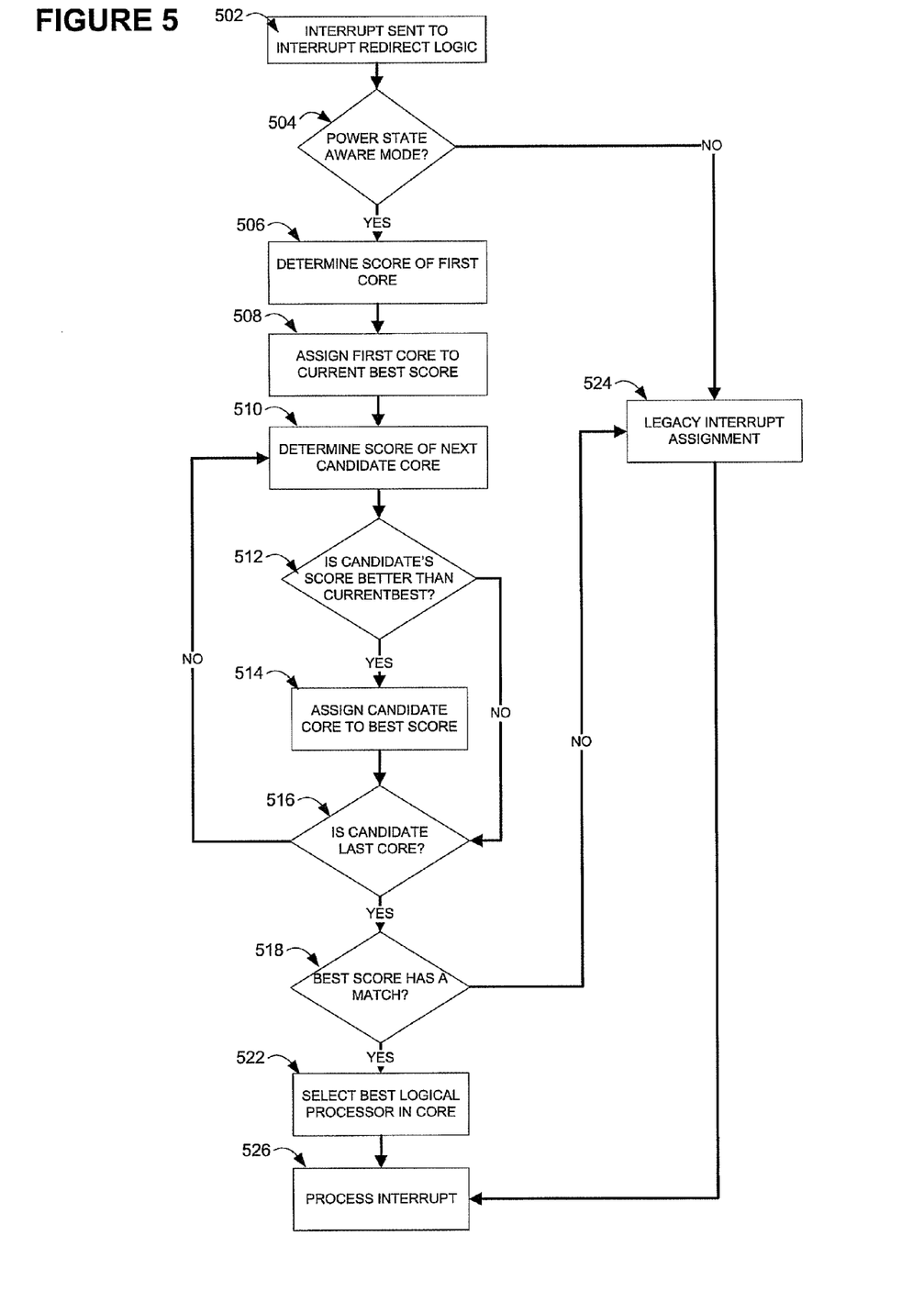

Reference is now made to FIG. 5, a flowchart of a method for rerouting interrupts in a multi-core processor according to an embodiment of the invention. Embodiments of the method may be used by, or may be implemented by, for example, computing system 100 of FIG. 1 or other suitable computing systems that incorporate multi-core processors and may assign interrupts to individual logical processors such as for example a logical processor 122. In some embodiments, the method of FIG. 5 may be implemented by protocol agent 120 operating in conjunction with PCU 118, although the invention is not limited in this respect. Additional or alternative components of computing system 100, multi-core processor 102, and/or hardware coordination logic 114 may be used.

As indicated in operation 502, an interrupt request may be received by for example interrupt redirect logic 124 of protocol agent 120, or other interrupt handling logic. In operation 504, the operating mode of interrupt redirect logic may be determined. In some embodiments, interrupt redirect logic 124 may operate in two or more modes including at least a power state mode and one or more legacy or other modes for assigning interrupts to logical processors such as for example a rotating or a fixed assignment mode as known in the art.

If the interrupt can be handled in a power state aware mode, then interrupt redirect logic may pick a first candidate core 112 to check and evaluate its power state. Interrupt redirect logic 124 may determine the first candidate's score (operation 506) by for example determining a composite rating such as a CPSL for the first candidate core 112 by querying for example APIC and power state table 128 for the power state and activity status for all logical processors of the first candidate core 112 that are a valid target for handling the interrupt. Once a CPSL has been calculated, interrupt redirect logic 124 may use the CPSL to look up a corresponding score or rating in for example policy table 128 and assign that score to the first candidate core 112. The scoring value assigned to each CPSL state in policy table 128 may reflect whether the interrupt is to be assigned based on conserving power, optimizing performance or other such policy. In operation 508, interrupt redirect logic 124 assigns this candidate to the current best score for all candidate cores 112 and retains this score and corresponding information for core 112.

Interrupt redirect logic 123 may proceed to determine the score or rating of a next candidate core 112 of multi-core processor 102 in operation 510 in the same manner as in operation 506. In operation 512, the score or rating of the current candidate's CPSL is compared with the current best score or rating. In some embodiments, a best score may be considered to be the lowest score rating corresponding to activity level or power state and matching with the interrupt being redirected to an allowed target logical processor. Alternatively, a best score may be considered to be a highest score rating. Other methods for determining the best score are also possible. For example, in a multicore with two cores having CPSL scores as defined above of CPSL_0 and CPSL_2 and in which power consumption is being minimized, the core having a score of CPSL_0 has the best score because at least one logical processor and both logical processors are idle.

If in operation 512 the current candidate has a better score than the current best score, then the candidate core may be assigned to the best score (operation 514) and stored in the same manner as performed in operation 508. If the current candidate score is not better than the current best score, the method may proceed directly to operation 516.

In operation 516, interrupt redirect logic 124 may determine if the current candidate core 112 is the final or last candidate, e.g. if all other cores 112 of multi-core processor 102 have been evaluated and scored. If there are any additional candidate cores 112 remaining, the method may return to operation 510. If there are no additional candidates, the method may continue with operation 518. Interrupt redirect logic 124 may check to see if the core with the best score has a logical processor 122 that matches the interrupt's addressing.

If the core 112 with the best score matches the interrupt's addressing, e.g. one or more logical processor 122's logical address is included as an allowable agent ID for the interrupt, then interrupt redirect logic 124 may in operation 522 assign the interrupt to one of the matching logical processors 122 in the core 112. In some embodiments, interrupt redirect logic 124 may select one of the matching logical processors 122 by first picking an idle logical processor 122, and if none are available, picking an active logical processor 122. Other techniques for selecting a matching logical processor 122 may also be used.

If, however, there is no matching logical processor as may be indicated by all cores having for example a CPSL_I score, interrupt redirect logic may proceed in operation 524 with an alternative technique for assigning interrupts as known in the art such as by rotating or fixed assignment, or other techniques. One circumstance for which no core 112 has a matching logical processor 122 may occur when an APIC's logical address change did not propagate to protocol agent 120. Similarly, if in operation 504, interrupt redirect logic 124 is not operating in a power state aware mode, then the method also proceeds with operation 524. Once operation 524 completes its determination of a best logical processor 122 and assigns the interrupt according to one or more of these known or legacy techniques, the interrupt redirect logic may in operation 526 process the using a best logical processor 122 of a core 112.

In operation 526, the best logical processor 122 may service or process the interrupt.

Other operations or series of operations may be used.

Some embodiments of the invention may also be used to redirect interrupts in multi-processor computer systems for which clusters may be defined across multiple processors. The components of protocol agent 120 may be located elsewhere in the computing system than depicted herein and/or operate with information gathered from logical processors across some or all of the processors in the multi-processor system. An APIC and power state table may be modified accordingly to allow one or more additional hierarchies for allocating logical processors, cores, and processors. Decisions for routing interrupts may be based on for example processor packages such as processor package power state instead of cores, although assignment based on other hierarchies is also possible.

While the invention has been described with respect to a limited number of embodiments, it will be appreciated that many variations, modifications and other applications of the invention may be made. Embodiments of the present invention may include other apparatuses for performing the operations herein. Embodiments of the invention may include a computer readable medium, such as for example a memory, a disk drive, or a Universal Serial Bus (USB) flash memory, including instructions which when executed by a multi-core processor, another processor, or another controller, may carry out methods disclosed herein. Such apparatuses may integrate the elements discussed, or may comprise alternative components to carry out the same operations. It will be appreciated by persons skilled in the art that the appended claims are intended to cover all such modifications and changes as fall within the true spirit of the invention.

The invention claimed is:

1. A method comprising:
routing an interrupt to a first core of a plurality of cores of a multi-core system; and
if the first core is in a power state at or below a threshold power state:
  determining a second core of the plurality of cores which is in a highest power state among the power states of the plurality of cores;
  rerouting the interrupt to the second core in the highest power state, wherein the interrupt is to be rerouted to the second core after the interrupt is routed to the first core; and
  processing the interrupt by the second core in the highest power state.

2. The method of claim 1, wherein rerouting comprises:
selecting a target core out of a plurality of valid target cores for the interrupt, the target core having a higher power state than the first core.

3. The method of claim 1, comprising processing the interrupt by the first core if no other core of the plurality of cores is in a higher power state than the power state of the first core.

4. The method of claim 1, wherein the threshold state is to comprise a C2 state or a lower power state than the C2 state.

5. The method of claim 1, wherein the highest power state is to consist of a C0 state and a C1 state.

6. The method of claim 1, wherein if the first core is in a power state at or below the C2 state and the second core processes the interrupt, the first core is to be demoted to the C0 state or the C1 state.

7. The method of claim 1, wherein the threshold state is to be determined based on an exit latency from the threshold state to respond to the interrupt.

8. The method of claim 1, wherein rerouting the interrupt to the second core is to be performed without regard for a priority of a task executing on the second core.

9. A system, comprising:
at least a plurality of cores capable of operating in three or more power states, comprising a C0 state, a C1 state, and a C2 state, and a hardware coordination logic to route an interrupt to a first core of the plurality of cores, to determine a core in the plurality of cores in a highest power state if the first core is in a power state at or below a threshold power state and to reroute the interrupt to the core in the highest power state, wherein the interrupt is to be rerouted to the core in the highest power state after the interrupt is routed to the first core; and
a system memory to store instructions;
wherein the core in the highest power state is to process the interrupt.

10. The system of claim 9, wherein the core in the highest power state is to process the interrupt simultaneously with the demotion.

11. The system of claim 9, wherein the hardware coordination logic is to reroute the interrupt by selecting a target core out of a plurality of valid target cores for the interrupt, the target core having a higher power state than the first core.

12. The system of claim 9, wherein the first core is to process the interrupt if no other core of the plurality of cores is in a higher power state.

13. An apparatus comprising:
at least a plurality of cores and a hardware coordination logic to, when an interrupt addressed to a first core of the plurality of cores is received, determine the power state of the first core, and if the first core is in a power state at or below a threshold power state, to reroute the interrupt to a second core of the plurality of cores in the highest power state, wherein the interrupt is to be rerouted to the second core after the interrupt is routed to the first core.

14. The apparatus of claim 13, wherein the core in the highest power state is to process the interrupt simultaneously with the demotion.

15. The apparatus of claim 13, wherein the first core is to process the interrupt if the first core is in the highest power state.

16. The apparatus of claim 13, wherein: the threshold state is to comprise a C2 state or a lower power state than the C2 state; the highest power state is to consist of a C0 state and a C1 state; and if the first core is in a power state at or below the C2 state and the second core processes the interrupt, the first core is to be demoted to the C0 state or the C1 state.

17. A method comprising:
determining a combined power state level (CPSL) of a first core of a plurality of cores of a multi-core system;
assigning a score to the first core based on its CPSL;
repeating said determining a CPSL and said assigning a score for a second core of the plurality of cores;
comparing the score of the first core with the score of the second core; and
assigning an interrupt to the core with the best score, wherein the interrupt is to be rerouted to the second core after the interrupt is routed to the first core.

18. The method of claim 17, wherein each core includes two or more logical processors, and the CPSL is determined by combining a rating of each processor.

19. The method of claim 18, wherein each core includes two or more logical processors, and determining the CPSL of each core comprises:
identifying a power state for each of the two or more logical processors of the core;
determining if a match exists between a target set of logical processors and each of the two or more logical processors of the core; and
assigning a CPSL based on the identified power states and matches of the logical processors of each core.

20. The method of claim 19, wherein identifying a power state for each of the two or more logical processors of each core comprises querying a table of power states for all logical processors of the multi-core system, the table entries including at least a logical address for each logical processor and power state status indicator.

21. The method of claim 17, wherein assigning a score to the first core based on its CPSL comprises determining the score using a policy table.

22. The method of claim 21, wherein the policy table is configured for minimizing power consumption.

23. An apparatus comprising:
an interrupt redirect logic to determine a combined power state level (CPSL) of a first core of a plurality of cores of a multi-core system, to assign a score to the first core based on its CPSL, to repeat said determining a CPSL and said assigning a score for a second core of the plurality of cores, to compare the score of the first core with the score of the second core, and to assign an interrupt to the core with the best score, wherein the interrupt is to be rerouted to the core with the best score after the interrupt is routed to the first core.

24. The apparatus of claim 23, wherein each core includes two or more logical processors, and the CPSL is determined by combining a rating of each processor.

25. The apparatus of claim 23, wherein each core includes two or more logical processors, and the interrupt redirect logic is to identify a power state for each of the two or more logical processors of each core, to determine if a match exists between a target set of logical processors and the two or more logical processors of each core, and to assign a CPSL based on the identified power states and matches of the logical processors of each core.

26. The apparatus of claim 25, wherein the interrupt redirect logic is to identify a power state for each of the two or more logical processors of each core by querying a table of power states for all logical processors of the multi-core system, the table entries including at least a logical address for each logical processor and power state status indicator.

27. The apparatus of claim 23, wherein the interrupt redirect logic is to assign a score to the first core' based on its CPSL, the score as determined by a policy table.

28. The apparatus of claim 27, wherein the policy table is configured for minimizing power consumption.

* * * * *